United States Patent Office 2,785,201
Patented Mar. 12, 1957

2,785,201

COMPOUNDS OF BIS QUATERNARY AMMONIUM DERIVATIVES OF PHENYLETHYLAMINE

Jean Thuillier, Paris, France, assignor to Societe de Personnes a responsabilite limitee: Cothera, Brussels, Belgium, and Laboratoires Belges Pharmacobel, Societe Anonyme, Brussels, Belgium No Drawing. Application December 21, 1954, Serial No. 476,850

Claims priority, application Belgium December 24, 1953

1 Claim. (Cl. 260—567.6)

The important properties of curarising substances introduced per rectum have recently been described by Delay and Thuillier in a series of publications during the course of the year 1952. The authors have reported the possibility of curarising rabbits by introducing fragments of suppositories into the rectum of these animals. They have used the same process in man not to obtain curarisation but hypotony, the therapeutic action of which they have studied in neuralogical and psychiatric syndromes.

The present invention is concerned with the preparation of novel compounds of bis quaternary ammonium derivatives of phenylethylamine and more particularly those having an asymmetric structure.

According to the invention these compounds are obtained by condensation of halides by means of the usual processes.

In fact this structure has proved particularly efficacious in its therapeutic applications, namely infracurarisation delay in vascular, digestive, gynaecological and neurological pathology, and muscular relaxation in neuropathic contractions and syndromes.

In accordance with the invention these compounds are obtained by the condensation of alkyl halides RX by the usual processes with a base of the following formula:

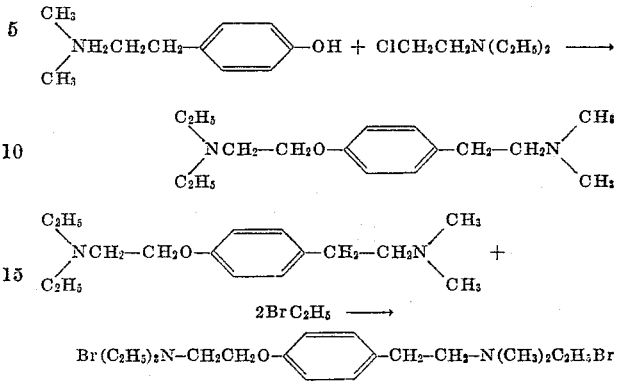

where $R_1$, $R_2$, $R_3$ and $R_4$ can be respectively the dimethyl, diethyl, dipropyl and piperidyl radicals.

An important characteristic is that the preparation of the base takes place in benzene medium, in heterogeneous phase by the etherification of derivatives of hydroxy phenylethylamine in the form of their sodium salts by means of dimethylaminoethyl, diethylaminoethyl, piperidylaminoethyl, dipropylaminoethyl and morpholylaminoethyl chlorides.

This method of procedure makes it possible to obtain yields of the order of 75% of the theoretical.

The quaternary ammonium salts derived from the base are prepared by reacting the latter with corresponding halogenated derivatives in acetone medium or without intermediate medium.

By way of example, the preparation of p-dimethylaminoethylphenoxy-ethyldiethylamine-N,N'-dibromo-ethylate of the following formula:

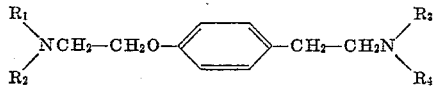

will be described below.

This body is obtained by the action of ethyl bromide on the base:

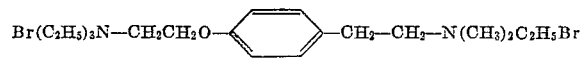

This base is prepared by etherifying the sodium salt of hordenine with the diethylaminoethyl radical, in accordance with the following reaction scheme:

*Preparation of the base*

165 g. of p-hydroxyphenylethyldimethylamine (hordenine) is dissolved in 750 cc. of absolute ethyl alcohol which has been distilled over sodium. An alcoholic solution of sodium ethylate is prepared by dissolving 23 g. of sodium in 250 cc. of ethyl alcohol.

The two solutions are mixed. The alcohol is expelled in vacuo and the sodium salt of hordenine thus obtained is dried in vacuo in the presence of potassium hydroxide. After complete desiccation the sodium salt of hordenine is suspended in 800 cc. of anhydrous benzene in a flask fitted with a stirrer and a reflux condenser.

135 g. of diethylaminoethyl chloride are then added. The latter is prepared for the purpose starting from its hydrochloride by liberation of the base by means of dilute aqueous sodium hydroxide and extraction of the chloride with ether. The ether is driven off by distillation on the water bath and the residue is immediately employed in the etherification reaction. The mixture obtained is heated under reflux with mechanical stirring for 2½ hours. The disappearance of the suspension of the sodium salt of hordenine is observed followed by the formation of a deposit of sodium chloride on the bottom of the flask. The sodium chloride formed is removed by filtering the benzene solution. The benzene is driven off by distillation under reduced pressure. The residue is distilled in vacuo. Boiling point 20 mm. Hg: 186–139° C. The base is present in the form of a heavy colourless oil which is sparingly soluble in water. 213 g. of p-dimethylaminoethylphenoxy-ethyldiethylamine are obtained, i. e. a yield of 75% of the theoretical.

*Preparation of p-dimethylamino-ethylphenoxy-ethyldiethylamine-N.N'-dibromo-ethylate*

142 g. of the base obtained as described above are dissolved in 100 cc. of anhydrous acetone and 55 g. of ethyl bromide are added slowly with stirring. The mixture obtained is left to stand for twenty-four hours at room temperature. The quaternary ammonium salt precipitates from the acetone medium in the form of an abundant white precipitate. It is dried, washed several times with anhydrous ether (using 50 cc. of ether) and dried in vacuo. The yield of the process is practically quantitative. 239 g. of the product are obtained. The instantaneous melting point on a Maquenne block is 137° C.

*Physical characteristics of p-dimethylamino-ethylphenoxy-ethyldiethylamino-N.N'-dibromo-ethylate*

The product is present in the form of white crystals which are slightly hygroscopic, very soluble in cold water, soluble in ethyl alcohol and insoluble in ether, acetone and benzene.

Chemical control of the product

The melting point of the product on the Maquenne block should be 137° C. The degree of chemical purity of the product will be controlled by estimation of the bromine by the Charpentier Volhard method carried out on an experimental sample of 0.100 g. This should give:

34.40 Br percent 34.45  (Br percent th. 34.42)

What I claim is:

p - Dimethylamino - ethylphenoxy - ethyldiethylamine-N.N'-dibromo-ethylate.

No references cited.